United States Patent [19]

Buchan et al.

[11] 4,155,652

[45] May 22, 1979

[54] DEVELOPER SENSING SYSTEM AND CONTROL

[75] Inventors: W. Raymond Buchan, Lincoln, Mass.; James E. Genthe, Newtown, Conn.

[73] Assignee: Itek Corporation, Lexington, Mass.

[21] Appl. No.: 765,320

[22] Filed: Feb. 3, 1977

[51] Int. Cl.[2] .............................................. G01N 21/00

[52] U.S. Cl. .................................... 356/342; 118/646; 355/3 DD; 356/445

[58] Field of Search ................ 356/103, 209; 118/646; 355/3 DD

[56] References Cited

U.S. PATENT DOCUMENTS

| | | | |
|---|---|---|---|
| 3,610,205 | 10/1971 | Rarey et al. | 118/7 X |
| 3,784,309 | 1/1974 | Brelot et al. | 356/209 X |

FOREIGN PATENT DOCUMENTS

| | | | |
|---|---|---|---|
| 1498513 | 4/1969 | Fed. Rep. of Germany | 356/103 |

OTHER PUBLICATIONS

Birth, "A Fiber Optics Reflectance Attachment", *Agricultural Engineering*, pp. 448, 449, Aug., 1967.

*Primary Examiner*—John K. Corbin
*Assistant Examiner*—Matthew W. Koren
*Attorney, Agent, or Firm*—David E. Brook

[57] ABSTRACT

A system is disclosed which will sense the image-development state of toner in the development subsystem of an electrophotographic copier apparatus. This image-development state is related to both toner concentration and the charge-to-mass ratio (q/m) existing on toner particles. The sensing system employs an optical fiber bundle having both transmitting and receiving fibers. At one end, herein referred to as the common end, and transmitting and receiving fibers are interspersed. This common end is positioned flush with the inside chamber wall on a developer housing. At the other end, the transmitting and receiving fibers are bifurcated. The transmitting fibers of the optical bundle are used to guide light from a light source to the common end, and part of the transmitted light is backscattered and guided through the receiving fibers to an optical sensor. The signal received is inversely proportional to the amount of toner deposited on the end of the bundle and the toner on the surface of carrier particles. This signal can be used to control the amount of toner added to the developer subsystem at any given time.

2 Claims, 2 Drawing Figures

DEVELOPER SENSING SYSTEM AND CONTROL

BACKGROUND OF THE INVENTION

1. Field of the Invention

This invention is in the field of electrophotography and more particularly relates to an optical toner sensing and toner replenishment system.

2. Description of the Prior Art

In the customary electrophotographic processes, a conductive backing having a photoconductive insulating layer thereon is electrostatically imaged by first uniformly charging its surface, and subsequently exposing the charged surface to a pattern of activating electromagnetic radiation, such as light. The radiation pattern selectively dissipates electrostatic charges in the illuminated area on the photoconductive surface, which results in the formation of a latent electrostatic image in non-illuminated areas. This latent electrostatic image can be developed to form a visible image by depositing developer materials thereon by a variety of development techniques, the most common of which is cascade development. The developed toner image is then transferred and fused to another substrate such as plain paper.

Typically, cascade development apparatus includes a housing including within it a bucket elevator system formed on an endless belt having buckets attached thereto. Electrostatic developer, consisting of carriers and toner particles, is lifted from a reservoir section in the buckets to a point at the upper portion of a photoconductive drum and is then cascaded over the drum surface by means of a feed guide. As developer cascades over the drum, toner particles separate from the carrier beads and deposit on the drum surface in accordance with the latent electrostatic image thereon, thus forming a visible toner image. Spent developer is guided back into the reservoir and is eventually lifted back to the upper portion of the drum by the elevator system. As development occurs, the concentration of toner particles within the system is, of course, depleted. Beyond the reduction in toner concentration, the image-development state is also affected by the charge-to-mass ratio existing on toner particles. This is affected, of course, by factors such as humidity and machine useage.

There are a variety of optical toner sensing systems described in the patent literature. Several of these operate by transmitting light through a developer layer. Typical of transmission sensing systems are those described in U.S. Pat. Nos. 3,430,606; 3,526,338; 3,791,744; 3,778,146. Such systems have a significant drawback, however, in that the optical path can become contaminated with toner particles thereby reducing the apparent transmission and interfering with accurate readout.

One patented system intended to overcome this problem is that described in U.S. Pat. No. 3,778,146. In this system, an area of the photoconductive drum located outside the imaging area is fabricated from a transparent material so that toner particles can be deposited thereon. An optical detector and light source are then used, but this system suffers because of the complicated drum configuration and the necessity to place either the sensor or light source within the drum.

Other optical toner sensing systems described in the patent literature involve the differential reflection from a developer mass and the use of a calibrated reflecting source. See, for example, U.S. Pat. No. 3,756,192. This system entails the use of a segment of the developer which is bypassed and intermittently sampled.

U.S. Pat. No. 3,610,205 discloses yet another system wherein the developer mix is passed by a window and light is passed through the window and reflected off this mix and subsequently sensed.

None of these systems, however, actually test the image-development state of developer as it exists at any finite moment in the system.

SUMMARY OF THE INVENTION

This invention relates to a system and a method for optically sensing the image-development state of toner in an electrophotographic developer subsystem. The system includes an optical fiber bundle which has both transmitting and receiving fibers. At one end, referred to as a common end, the transmitting and receiving optical fibers are interspersed. The other end of the optical fiber bundle is bifurcated into the two types of fibers.

A light source is positioned at the bifurcated end in such close proximity to the transmitting fibers that they can guide light from the light source to the common end. The light source is shielded from the bifurcated receiving fibers. Light which is guided to the common end is directed to the layer of toner deposited on the common end and to adjacent developer. Some of this light is back-scattered to the receiving fibers which transmit it to the bifurcated end where means to sense the intensity of this back-scattered light are located. The intensity signal measured in this way is inversely proportional to the image-development state of toner within the developer housing.

The optical toner sensing and replenishment system described herein has advantages over systems heretofore available. For example, when copiers employing prior art sensing systems were started after they have been shut down for any significant period, a temporary but erroneous signal was often produced indicating that the toner concentration was low. The result was the addition of toner, but the system didn't require additional toner, but merely required sufficient time of operation to re-establish an adequate charge-to-mass ratio. In contrast, the system described herein produces an initial signal which may also be erroneous but nevertheless indicates that the toner concentration is more than adequate. When the machine is initially started, the system of this invention relies primarily upon a layer of toner deposited on the surface of the common end, but as machine operation continues this layer becomes partially depleted allowing the system to also sense the amount of toner on carrier beads in the developer.

Further, all of the active elements in the system described herein are external to the operating parts of the developer subsystem. There is no need to locate parts within the photoconductive drum, etc. Since the size of the detector can be extremely small, very little interference with the normal operation of the system is encountered. Also, since the parts are located external, they can be easily serviced.

The system is also self-stabilizing during operation of the machine because the common end of the optical fiber bundle encounters a continual deposition and removal of toner particles until an equilibrium is reached. Thus, the toner layer deposited on the common end of the optical fiber bundle is a very direct measure of the image-development state of toner within the developer subsystem. The output signal has been found, in fact, to correlate exceptionally well with the image-development state of a developer subsystem.

Finally, unlike many of the prior art systems, this system provides for continuous readout, and not just intermittent sampling of the image-development state of a developer subsystem at certain time intervals.

DESCRIPTION OF PREFERRED EMBODIMENTS

Figure 1:
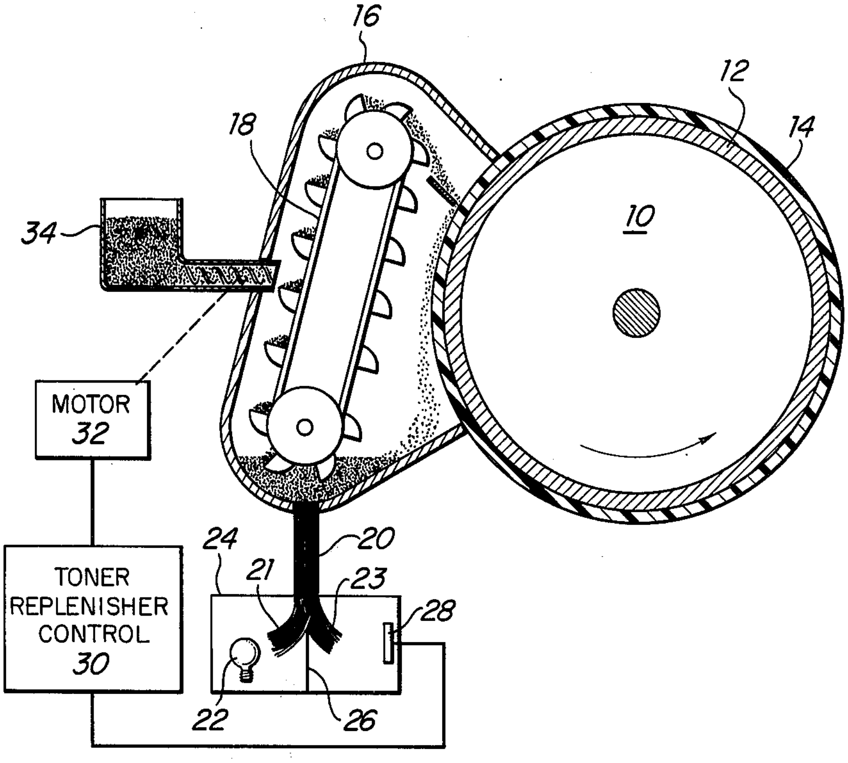
FIG. 1 illustrates schematically an electrophotographic developer subsystem including an optical toner sensing system of this invention; and, FIG. 2 illustrates a cross-sectional view of the common end of an optical fiber bundle suitable for use in this invention.

The invention can be further described by referring to the drawings in more detail.

In FIG. 1, an electrophotographic copier developer subsystem is illustrated, together with the elements of this invention. A photoconductive drum 10 is typically formed from a conductive metal 12, such as aluminum, which is coated with a photoconductive coating 14, such as vitreous silenium. As shown by the arrow, photoconductor 10 is rotating, in this illustration, in the downhill direction with regard to the development subsystem.

The development subsystem is formed from an outer housing 16, which encloses a standard bucket elevator transport system 18. In operation, electroscopic developer accumulates in the bottom, or reservoir section of the elevator system, wherein it is scooped into the buckets, transported to the top of the system, and dumped onto the photoconductive drum to develop an electrostatic image thereon.

The common end of an optical fiber bundle 20 is inserted through the bottom portion of the developer housing 16 to be flush with the inner wall. Optical fiber bundle 20 contains both transmitting and receiving optical fibers, and the end inserted through the developer housing has both types interspersed at a common end. At the other end of the bundle, the fibers are bifurcated into transmitting fibers 21 and receiving fibers 23. Transmitting fibers 21 are illuminated by light source 22 contained within an appropriate housing 24 which also contains partition 26 to prevent light from light source 22 reaching bifurcated receiving fibers 23.

Care has to be taken to insert the common end of the optical fiber bundle 20 into the developer housing at a location where developer slowly but continuously moves across the face of this terminal portion. As shown, one preferred area is at the bottom of a standard elevator development housing. It has also been found that the common end must be inserted at an area where not less than 1/16" of a layer of developer is customarily deposited. As illustrated, the common end is inserted at an area wherein the reservoir of developer is continuously agitated by the buckets on the elevator system. This is desirable so that an equilibrium layer of toner deposits on the face of the common end of the optical fiber bundle 20. If the developer is rich in toner, this layer will increase until an equilibrium is reached, whereas it will become depleted if the developer is poor in toner. The charge-to-mass ratio at any particular time also affects the thickness of this toner layer.

Although the common end of optical fiber bundle is shown as being inserted through the bottom of the developer housing, other locations would also be suitable. It does not have to be in an area that is horizontal since a layer of toner will often by deposited even on the verticle wall sections of the development housing. The requirement is only that it be an area where developer is flowing and in which the thickness of the flowing developer is at least 1/16" thick.

In operation, light is guided from light source 20 along the transmitting fibers 21 within the optical fiber bundle 20 to the common end. Light scattered from the ends of the active elements is then back-scattered from both toner facets and carrier surfaces. Back-scattered light guided back by receiving fibers 23 is then sensed by photodetector 28, which might be, for example, a photocell, photodiode, phototransistor or photomultiplier. The intensity of light sensed by photodetector 28 is inversely proportional to the image-development state of developer within the development system.

With fresh developer, the charge-to-mass ratio is usually low which reduces the electrostatic binding forces holding toner on the carrier. This results in deposition of a relatively thicker layer of toner at the common end of the fiber optic bundle. Therefore, the output signal is reduced. After agitation of the developer, the charge-to-mass ratio increases thereby increasing the binding forces of toner to carrier and depleting the layer across the face of the optic fiber bundle. Thus, the output signal increases in this case. In both cases, toner concentration may be the same, but a different signal is read out depending on the specific charge-to-mass ratio.

As the system is operated and toner is used in the development of copy, the charge-to-mass ratio increases. This also depletes the layer of toner at the terminal end of the optical fiber bundle and causes an increased output signal.

The output signal from photodetector 28 can be fed to a toner-replenisher control 30, which in turn activates motor 32 to drive the auger 34 in toner replenishment apparatus 34.

Figure 2:
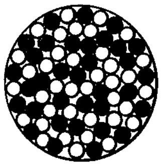

A cross-section of the common end of an optical fiber bundle having interspersed transmitting and receiving fibers is shown in FIG. 2. For purposes of illustration, the transmitting fibers are shown without shading, whereas the receiving fibers are shaded solid. In practice, of course, these would be the same. Suitable bifurcated optical fiber bundles are commercially sold by American Optical Corporation.

Those skilled in the art will recognize, or be able to determine using no more than routine experimentation, many equivalent elements to those specifically described herein. Such equivalents are intended to be covered by the claims appended hereto.

What is claimed is:

1. A method for sensing the image-development state is an electrophotographic developer subsystem having developer of carriers and toner particles, comprising:
   a. providing an optical fiber bundle containing both transmitting and receiving fibers, said transmitting and receiving fibers being interspersed at a common end thereof and bifurcated at a sensing end thereof;
   b. inserting the common end of the fiber bundle through the housing of said developer subsystem so that it is substantially flush with the interior wall thereof at a location where toner depleted developer is flowing within said subsystem but where toner settles as a layer, the thickness of the layer being inversely related to the charge-to-mass ratio of the developer;

c. illuminating the transmitting optical fibers at the sensing end of said fiber bundle; and, d. sensing the thickness of said toner layer by the intensity of backscattered light at the sensing end of said receiving fibers.

2. A method for developing the image-development state in an electrophotographic developer as claimed in claim 1 wherein the fiber optic bundle is inserted at a location within a reservoir developer where the thickness of the layer of toner is in the order of 1/16 inch or greater.

* * * * *